Lester W. Toelke
Walter W. Walling
INVENTORS

BY
ATTORNEY

United States Patent Office 3,453,004
Patented July 1, 1969

3,453,004
APPARATUS FOR WELDING INTERNALLY-COATED TUBULAR MEMBERS
Lester W. Toelke and Walter W. Walling, Houston, Tex., assignors to Schlumberger Technology Corporation, Houston, Tex., a corporation of Texas
Continuation-in-part of application Ser. No. 573,712, Aug. 19, 1966. This application Nov. 24, 1967, Ser. No. 685,662
Int. Cl. F16l 59/16, 55/00
U.S. Cl. 285—55   14 Claims

ABSTRACT OF THE DISCLOSURE

The particular embodiments described herein as illustrative of the invention relates to apparatus for use in assembling two or more tubular members by welding. More particularly, the present invention as disclosed herein is directed to new and improved apparatus enabling sections of pipe as well as pipe fittings, valves, and the like, that are internally protected with a thin coating of an organic thermoplastic or thermosetting plastic material to be assembled by fusion welding in such a manner that all internal surfaces of the assembled conduit will be corrosion-resistant.

This application is a continuation-in-part of a copending application, Ser. No. 573,712, filed Aug. 19, 1966, and now abandoned.

Heretofore, no particularly satisfactory techniques have been devised for welding sections of pipe and their associated fittings that have been previously coated internally with one of the thin-film organic thermoplastic or thermosetting plastic materials that are typically classified as either a vinyl, an epoxy, an alkyd, an acrylic, or a phenolic. Those skilled in the art will readily appreciate that the high metal temperatures normally developed for sevral inches in either direction from a joint as it is being welded will quickly char and otherwise so degrade even the best of such coating materials that a continuous coating along a pipeline cannot be achieved unless it is coated in place. To offset this obvious disadvantage, the only practical alternate provided so far has been to weld short, tubular extensions of a selected corrosion-resistant metal or stainless steel to each end of all of the fittings, valves, and the pipe sections before these latter members are coated. In this manner, all welded joints subsequently made in assembling such a pipeline will be only at the extensions and the plastic coating in the remainder of the line will not be subjected to the welding temperatures. Although this technique assures a well-protected pipeline, the substantial costs of such heavy-wall stainless steel extensions and welding rods make it economically unattractive particularly where a long pipeline is being assembled. The cost differential will also become more significant where large-diameter pipelines are involved as well as where considerable operating pressures are to be experienced.

Accordingly, it is an object of the present invention to provide new and improved apparatus enabling internally-coated tubular members to be inexpensively joined by fusion welding in such a manner that a corrosion-resistant internal surface will be provided at each welded joint even where large diameters and/or high operating pressures are involved.

This and other objects of the present invention are obtained by securing a relatively-thin liner or sleeve of a selected corrosion-resistant metal within each end of a tubular member that is to be protected against internal corrosion attack. Before the tubular member is joined to another, a suitable corrosion-resistant thin-film organic plastic coating is applied over the internal surfaces of the tubular member and at least a portion of the corrosion-resistant liner. An alternate arrangement involves securing a sleeve liner of this nature with a corrosion-resistant adhesive within each end of a previously-coated tubular member. In either case, whenever tubular members arranged in accordance with the invention are welded to one another, each welded joint will be provided with a corrosion-resistant surface that is contiguous with the undamaged plastic-coated surfaces on each side of the joint.

The novel features of the present invention are set forth with particularity in the appended claims. The operation, together with further objects and advantages thereof, may best be understood by way of illustration and example of certain embodiments when taken in conjunction with the accompanying drawings, in which:

Figure 1:
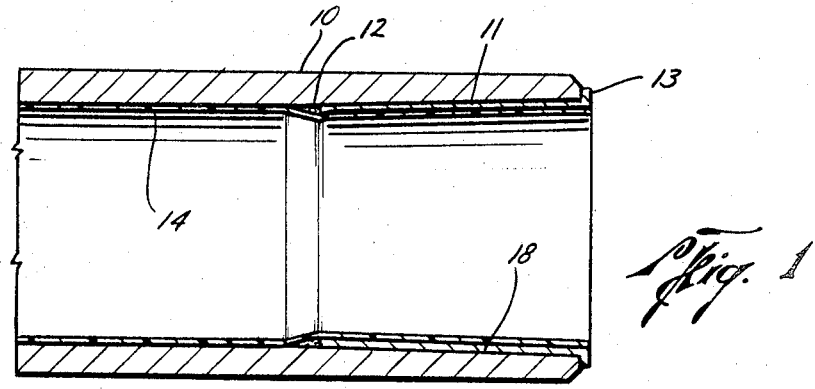
FIGURE 1 depicts one end of a typical tubular member as it will appear when provided with apparatus arranged in accordance with the principles of the present invention.

Turning now to FIGURE 1, one end is shown of a tubular member 10 such as a section of pipe, a valve, or one of the various fittings that may be used in assembling a welded conduit or pipeline. A tubular liner or thin-walled sleeve 11 of a suitably selected Monel, stainless steel, or other corrosion-resistant metal has been complementally fitted into the open end of the tubular member 10 and secured in place by a continuous circumferential weld or brazed bead 12 joining the inner end of the liner sleeve to the inner surface of the tubular member. The outer end of the liner sleeve 11 is allowed to project just beyond the end of the tubular member 10 and is preferably provided with an outwardly-directed transverse projection or flange 13 that is extended over at least a portion of the end of the tubular member. The internal surface of the tubular member 10 is coated with a thin film of one of the aforementioned thermoplastic or thermosetting organic plastic materials 14 that extends without interruption over the internal weld 12 and at least a portion of the inner end of the sleeve liner 11.

Those skilled in the art will, of course, appreciate that the thickness of the plastic coating 14 has been greatly exaggerated in FIGURE 1. Similarly, the thickness of the sleeve liner 11 in relation to the wall thickness of the tubular member 10 has also been exaggerated to better illustrate the invention. Accordingly, it will be understood that the thickness of the plastic coating will, in most instances, be in the order of only 5 to 10-mils and rarely, if ever, be any thicker than about 30 to 40-mils. The sleeve liner 11 is also relatively thin and, for purposes of economy, will rarely need to be any thicker than about 10-BWG (about 0.14-inch). It should be realized, therefore, that the insert 11 needs only to be of sufficient thickness to allow it to be expeditiously welded by typical welding procedures. It will be appreciated, of course, that the flange 13 (or a separate backing ring of similar proportions) will enable relatively higher welding currents and larger rods to be used than would be possible if the backing were not provided. It is preferred, however, to make the flange 13 integral since this will assist in positioning the insert 11 within the tubular member 10. Moreover, with an integral flange 13, the insert 11 will be greatly reinforced against inward crushing or deformation before the tubular member 10 is joined to another.

Figure 2:
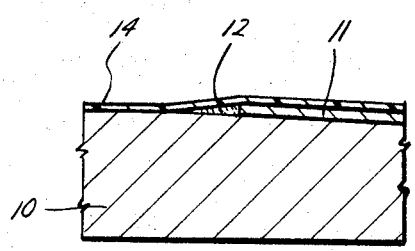
FIGURE 2 is an enlarged view of one portion of the apparatus shown in FIGURE 1.

Turning now to FIGURE 2, a greatly enlarged view is shown of the inner end of the insert or liner 11 to further illustrate the significance of the weld or brazed joint 12. It will be appreciated that with a continuous fillet such as at 12, there will be a smooth transition of the plastic coating 14 from the tubular member 10 onto the insert 11. This will assure a uniform coating thickness across the weld 12 which, without the weld, would not necessarily be achieved over the abrupt end of the liner 11. The brazed or weld joint 12 further serves to secure the liner 11 in position after the coating 14 is applied. Thus, the liner 11 cannot shift in relation to the tubular member 10 and either damage or destroy the integrity of that portion of the coating 14 bridging between the tubular member and inner end of the liner.

Figure 3:
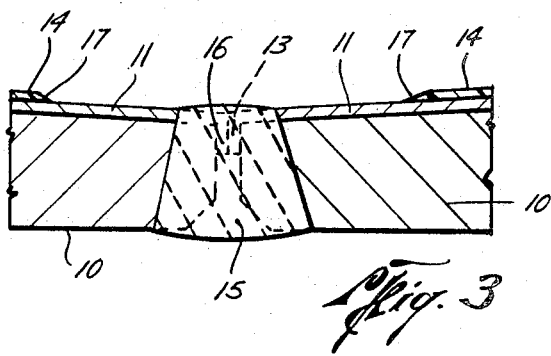
FIGURE 3 is an enlarged view showing portions of two members as shown in FIGURE 1 after they have been welded to one another.

In FIGURE 3, the adjacent ends of two tubular members 10 are shown abutted together and joined by a circumferential weld 15. It will be appreciated from the dashed lines that the weld 15 has fused the tubular members 10 and the adjacent ends of the inserts 11 into an integral joint. By using welding rods of properly selected corrosion-resistant base metals for at least the initial passes of the weld 15, the insert flanges 13 will be joined to each other and to the tubular members 10 so that at least the inner portion 16 of the weld 15 will be of a suitable corrosion-resistant metal similar or identical to the metal composing the inserts 11. The remainder of the weld 15 can, of course, be made with welding rods of the same or similar corrosion-resistant metals or even of carbon steels appropriately chosen to be compatible with all of the metals involved. The selections of the particular stainless steels or corrosion-resistant metals for the inserts 11 as well as of the particular types of welding rods are, of course, dictated by the anticipated service requirements of the completed conduit and the criteria determining such selections are well understood by those with even ordinary skill in the art.

Of particular significance to the invention, it will be noted that although the plastic coatings 14 do not extend to the weld 15, the inner coated portions of the inserts 11 extend well beyond any damaged portion of the coatings so that no portions of the internal surfaces of the tubular members 10 are exposed. As previously noted in regard to FIGURE 2, the coatings 14 provide a continuous protective film between the tubular members 10 and the inner portions of the inserts 11. Thus, as shown in FIGURE 3, even though the heat developed in making the weld 15 will destroy or damage any portion of the coatings 14 immediately adjacent thereto, the only exposed metal surfaces will be whatever stainless steel or corrosion-resistant metals are used for the inserts 11 as well as the inner portion 16 of the weld. It will be appreciated, moreover, that the terminal portions of the coatings 14 will be bonded to the inserts 11 as at 17 so that a corrosive substance in the tubular members 10 cannot flow in between the coatings and the inserts.

Figure 4:
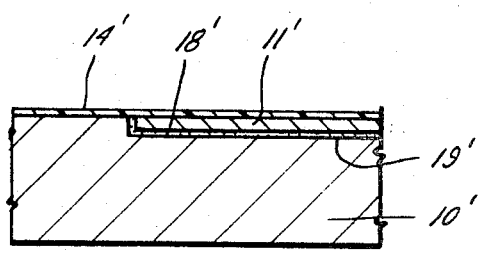

It will be realized, of course, that although the ends of the tubular members 10 are shown as preferably having an outwardly diverging counterbore as at 18 in FIGURE 1 to reduce flow restrictions, these counterbores and the inserts 11 could just as well be of a uniform diameter. It is preferable, however, to minimize any irregularity in the internal surfaces of a flow conduit. Accordingly, in another manner of providing a smooth flow conduit, the ends of the tubular members 10' are slightly counterbored with a substantially uniform internal diameter as shown at 18' in FIGURE 4 to make the internal surface of the inserts 11' substantially flush with the internal surface of the tubular members 10'. In this manner, the coating 14' will have little or no deviation as it passes over the junction between the tubular member 10' and the insert 11'. The outer end of the insert 11' is, of course, arranged with a flange as shown in FIGURE 1 at 13.

As previously discussed, it is essential to the success of the present invention that the insert 11' be secured to the tubular member 10'. This could, of course, be accomplished by a weld or brazed bead as at 12 in FIGURES 1 and 2. It is preferred, however, to employ a suitable adhesive as shown at 19' in FIGURE 4 to secure the insert 11' in relation to the tubular member 10'. Since the coating 14' will cover the adhesive 19', it will be realized that the adhesive needs only to be capable of securing the insert 11' to the tubular member 10'. It should be noted that the adhesive 19' will support the coating 14' and prevent it from failing at the junction of the insert and tubular member.

The embodiments of the present invention shown in FIGURES 1–4 are particularly adapted for assembly in a fabricating shop having coating apparatus as well as ovens and the like for baking the coatings after they are applied. Thus, considering the limitations of equipment typically available in the field and the conditions usually encountered in laying a pipeline, the embodiments disclosed in FIGURES 1–4 would typically be prefabricated in a shop and taken to the job site ready for the joint weld as at 15.

Figure 5:
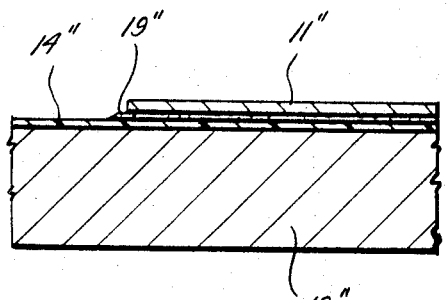
FIGURES 4 and 5 are enlarged views similar to FIGURE 2 but respectively illustrating portions of alternative embodiments of the present invention.

To provide for those instances where a field joint must be made in an existing pipeline that is already coated, an alternative to the present invention is shown in FIGURE 5. As shown in FIGURE 5, an insert 11″ of a suitable stainless steel or corrosion-resistant metal and similar or identical to the insert 11 is fitted into the end of a tubular member 10″ that has a previously applied coating 14″. To secure the insert 11″ in place, a corrosion resistant adhesive 19″, such as an epoxy cement, is employed. Thus, by using a continuous film of the corrosion-resistant adhesive 19″, a corrosive substance in the tubular member 10″ cannot flow back into the annular clearance left between the insert 11″ and the coating 14″ and attack the surfaces of the tubular member exposed by destruction or degradation of the coating as the tubular member is welded to another. Thus, it will be appreciated that although a weld (as at 15 in FIGURE 3) will destroy that portion of the coating 14″ immediately adjacent to the weld, the inner surfaces of the insert 11″ and the weld will be of selected corrosion-resistant metals, with these surfaces being contiguous with the undamaged areas of the coating 14″ by virtue of the corrosion-resistant adhesive 19″.

Accordingly, it will be appreciated that the present invention has provided various embodiments of new and improved apparatus for providing continuous corrosion-resistant internal surfaces for a conduit which must contain a corrosive substance. By using sleeves or inserts of a suitable corrosion-resistant metal and welding the adjoining ends of adjacent tubular members and their respective inserts to one another with welding rods of suitable corrosion-resistant base metal, a continuous corrosion-resistant internal metal surface will be provided across each joint. The remaining portions of the internal surfaces of the tubular member will be coated with a suitable plastic coating that is integrally bonded to the insert either by a continuous and undamaged extension of the coating or by a corrosion-resistant adhesive. Of significance, it will be realized that although the insert is itself of insufficient thickness to withstand even minimal fluid pressures, the insert is, of course, supported by the tubular member which is itself capable of confining such pressures.

What is claimed is:

1. A welded assembly adapted to contain a corrosive substance and comprising: first and second tubular members of corrodible weldable metal and having adjoining ends coincidentally aligned and opposing one another; first and second tubular sleeves of weldable metals having corrosion-resistant characteristics respectively received in said adjoining ends of said first and second tubular members, with each of said tubular sleeves having one end adjacent to said adjoining end of its associated tubular member and another end extending on into the internal bore thereof for a distance calculated to be greater than the distance which heat developed upon fusion-welding of said tubular members to one another at their said adjoining ends will raise the surface temperatures of said internal bores to a coating-degrading temperature; first and second means respectively fluidly sealing and joining said other ends of said tubular sleeves to their associated tubular member; first and second corrosion-resistant organic thermoplastic or thermosetting plastic coatings respectively covering said internal bores of said tubular members, said joining means, and at least the internal bores of said tubular sleeves immediately adjacent to said other ends thereof; and a circumferential fusion weld around and integrally fusing said adjoining ends of said tubular members and said adjacent ends of said tubular sleeves to one another and having at least a first portion thereof of a corrosion-resistant base metal for providing a fluid-tight joint with a continuous corrosion-resistant internal surface.

2. The welded assembly of claim 1 wherein: each of said tubular sleeves has an outwardly-directed flange portion with one face thereof abutting said adjoining end of its said associated tubular member and the other face thereof abutted with the corresponding other flange face of the other of said tubular sleeves.

3. The welded assembly of claim 1 wherein said first and second joining means are comprised of: an adhesive between each of said tubular sleeves and its said associated tubular member.

4. The welded assembly of claim 1 wherein said first and second joining means are respectively comprised of: a weld between each of said other ends of said tubular sleeves and its said associated tubular member.

5. The welded assembly of claim 4 wherein: said welds are fusion welds.

6. The welded assembly of claim 4 wherein: said welds are brazed welds.

7. The welded assembly of claim 1 wherein: said adjoining ends of said tubular members are respectively counterbored for complementally receiving said tubular sleeves.

8. The welded assembly of claim 1 wherein: said adjoining ends of said tubular members are respectively counterbored to provide an inwardly converging tapered socket, and said tubular sleeves are respectively tapered for complementally fitting said counterbored sockets.

9. As a subcombination, apparatus comprising: a tubular member of a corrodible weldable metal and having one open end adapted for welding to another tubular member; a tubular insert of a weldable metal having corrosion-resistant characteristics complementally fitted into said open end of said tubular member and having one end adjoining said open end of said tubular member and another end extending into the internal bore of said tubular member for a distance calculated to be beyond portions of said tubular member and said tubular sleeve that will be subjected to coating-degrading temperatures upon fusion-welding around said open end of said tubular member; a weld fluidly sealing and joining said other end of said tubular insert to said tubular member; and a corrosion-resistant coating of an organic thermoplastic or thermosetting plastic continuously covering said internal bore of said tubular member, said weld, and at least a portion of the internal bore of said tubular insert.

10. The apparatus of claim 9 wherein: said tubular insert further includes a circumferential flange around its said one end and extending outwardly across the face of said open end of said tubular member.

11. As a subcombination, apparatus comprising: a tubular member of a corrodible weldable metal and having one open end adapted for welding to another tubular member; a tubular insert of a weldable metal having corrosion-resistant characteristics complementally fitted into said open end of said tubular member and having one end adjoining said open end of said tubular member and another end extending into the internal bore of said tubular member for a distance calculated to be beyond portions of said tubular member and said tubular sleeve that will be subjected to coating-degrading temperatures upon fusion-welding around said open end of said tubular member; an adhesive fluidly sealing and joining said other end of said tubular insert to said tubular member; and a corrosion-resistant coating of an organic thermoplastic or thermosetting plastic continuously covering said internal bore of said tubular member, said adhesive, and at least a portion of the internal bore of said tubular insert.

12. The apparatus of claim 11 wherein: said tubular insert further includes a circumferential flange around its said one end and extending outwardly across the face of said open end of said tubular member.

13. As a subcombination, apparatus comprising: a tubular member of a corrodible weldable metal and having one open end adapted for welding to another tubular member; a corrosion-resistant coating of an organic thermoplastic or thermosetting plastic continuously covering said internal bore of said tubular member; a tubular insert of a weldable metal having corrosion-resistant characteristics complementally fitted into said open end of said tubular member and having one end adjoining said open end of said tubular member and another end extending into the internal bore of said tubular member over said corrosion-resistant coating for a distance calculated to be beyond portions of said tubular member and said tubular sleeve that will be subjected to coating-degrading temperatures upon fusion-welding around said open end of said tubular member; and an adhesive fluidly sealing and joining said other end of said tubular insert to said corrosion-resistant coating.

14. The apparatus of claim 13 wherein: said tubular insert further includes a circumferential flange around its said one end and extending outwardly across the face of said open end of said tubular member.

References Cited

UNITED STATES PATENTS

| 2,356,047 | 8/1944 | Geisinger et al. | 285—55 X |
| 2,943,387 | 7/1960 | Dawson | 285—55 X |
| 3,228,096 | 1/1966 | Albro | 285—55 X |
| 3,266,820 | 8/1966 | Leborgne et al. | 285—55 X |

FOREIGN PATENTS

| 1,068,068 | 10/1959 | Germany. |
| 1,162,651 | 2/1964 | Germany. |

CARL W. TOMLIN, *Primary Examiner.*

D. W. AROLA, *Assistant Examiner.*

U.S. Cl. X.R.

29—4711; 285—286